Jan. 2, 1951          R. H. WENDT          2,536,246
MEAT FRYING COVER AND REMOVABLE HANDLE
Filed Dec. 9, 1947          2 Sheets—Sheet 1
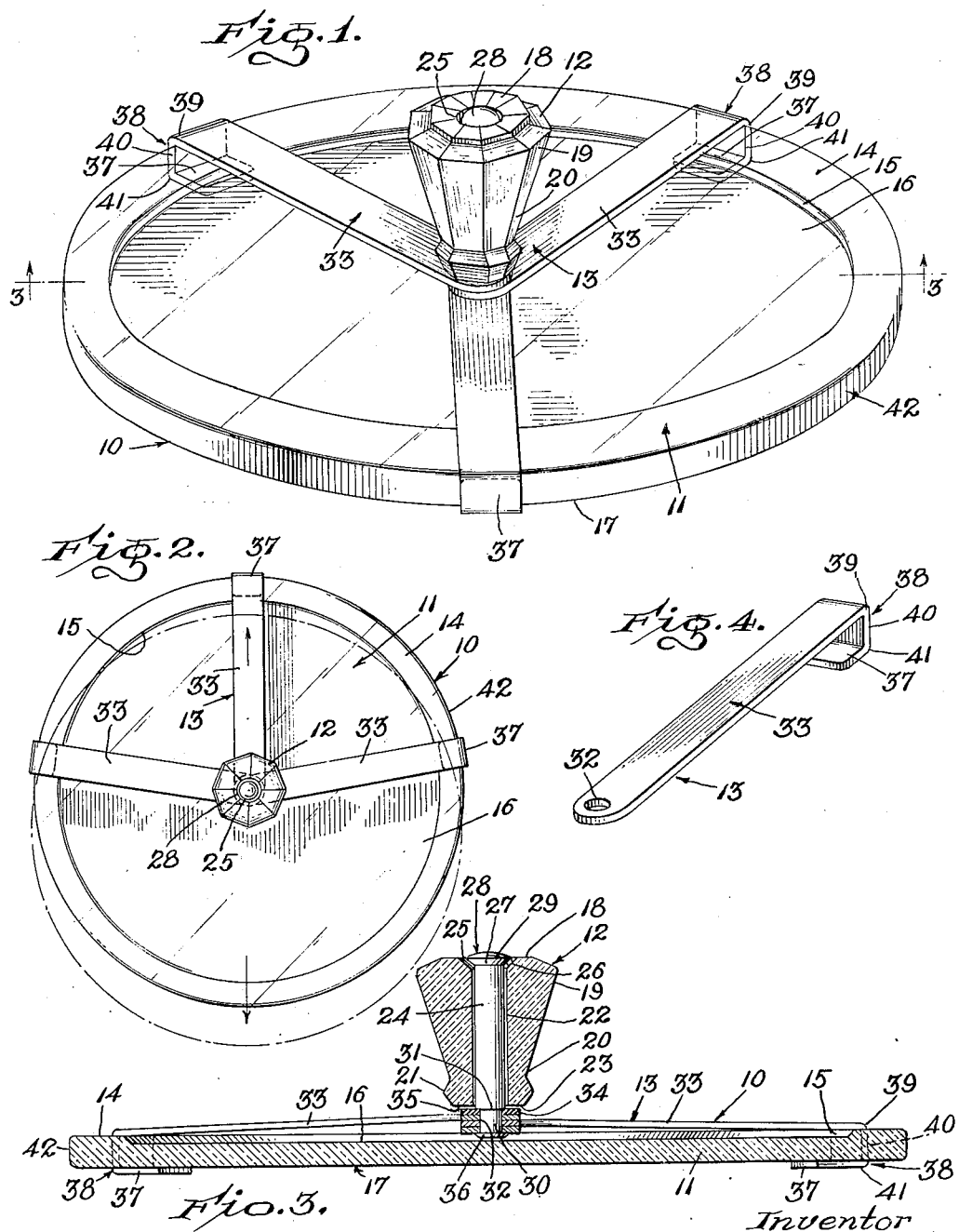
Inventor
Robert H. Wendt Jan. 2, 1951  R. H. WENDT  2,536,246
MEAT FRYING COVER AND REMOVABLE HANDLE
Filed Dec. 9, 1947  2 Sheets-Sheet 2
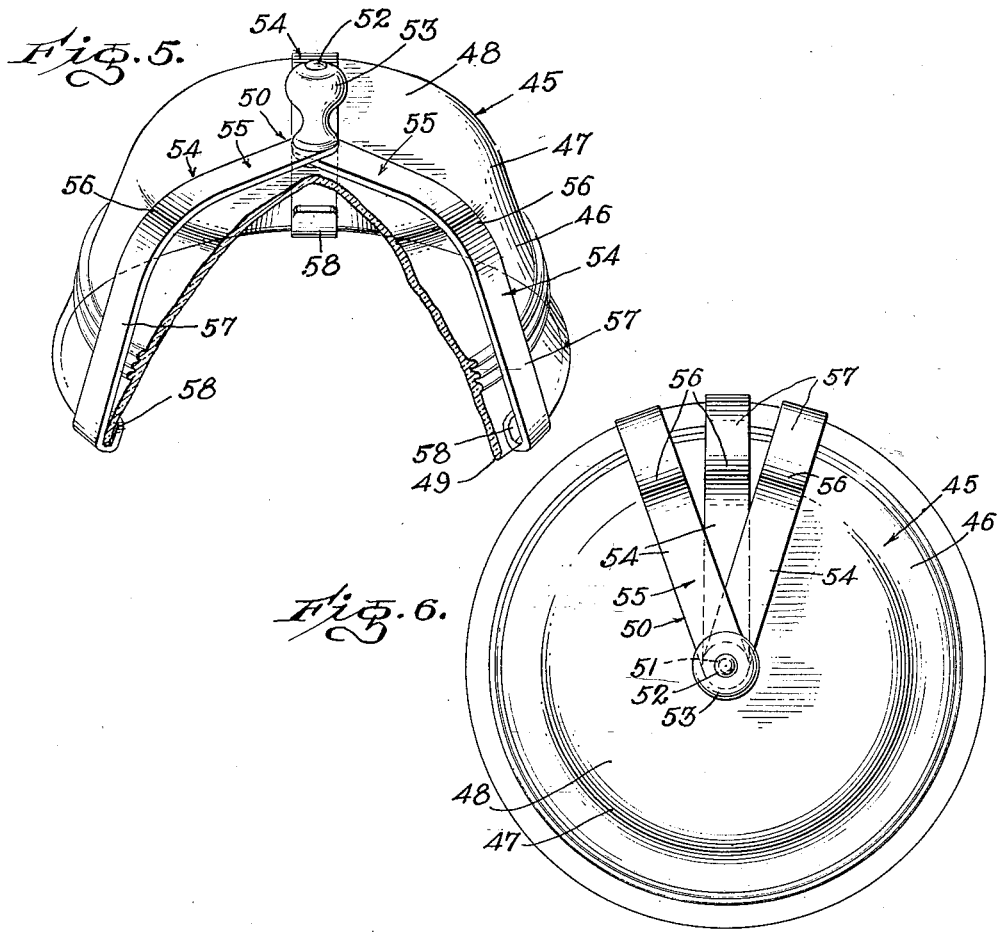
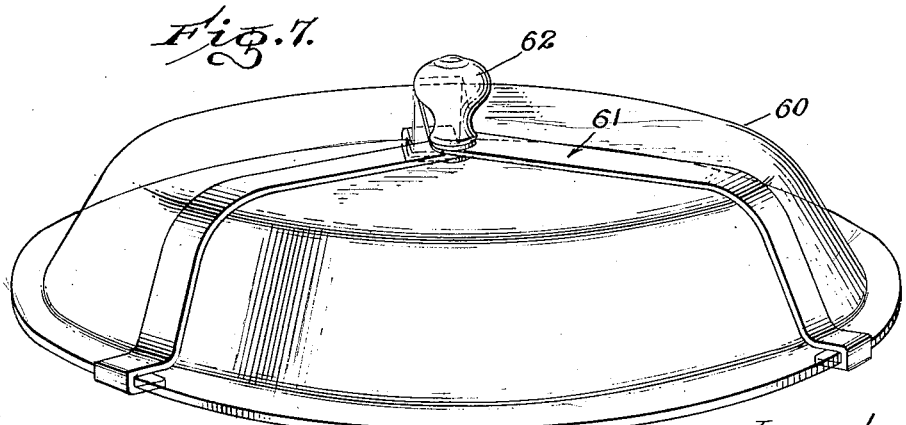
Inventor
Robert H. Wendt Patented Jan. 2, 1951

2,536,246

UNITED STATES PATENT OFFICE 2,536,246

MEAT FRYING COVER AND REMOVABLE HANDLE

Robert H. Wendt, Evanston, Ill.

Application December 9, 1947, Serial No. 790,608

4 Claims. (Cl. 294—27)

The present invention relates to meat frying covers, and is particularly concerned with the provision of an improved cover for holding meats, such as bacon, which have a tendency to curl in tight flat engagement with the frying pan or griddle so that the bacon is subjected to an even heat throughout, and is more quickly and thoroughly cooked to a uniform condition.

The present application relates to an improvement over a prior Patent No. 1,783,792, patented December 2, 1930, on a cooking utensil.

One of the objects of the invention is the provision of an improved meat frying assembly by means of which bacon or other meat may be fried in such manner that all parts of the bacon are uniformly brought to the same condition and so that curling of the bacon is substantially eliminated.

Another object of the invention is the provision of an improved frying assembly by means of which the frying of bacon or similar meats may be expedited due to the fact that the heat from the frying pan or griddle, which would ordinarily escape from the top of the bacon, is reflected into the bacon so that a maximum effect is derived from the heat applied.

Another object of the invention is the provision of an improved frying assembly of the class described in which the condition of the bacon or other meat may be observed at all times so that care may be taken to see that it lies flat on the griddle or frying pan and so that the operation may be concluded without the bacon being burned.

Another object of the invention is the provision of an improved covering device for engaging bacon in the griddle or frying pan or on a hot plate, by means of which the bacon may be held in absolutely flat condition, so that it is in uniform contact, over its full area, with the frying surface, so that the heat, which would otherwise escape, will be reflected into the bacon and so that the bacon will be constantly visible, lest it be burned or fried to a crispness beyond that desired.

Another object is the provision of an improved modification comprising a transparent cover in the shape of an inverted receptacle of flame-resistive or heat-resistive glass, provided with a similar handle structure and adapted to be used for covering thicker individual pieces of meat and for forming with the grease in the pan or on the griddle a substantially air-tight enclosure, by means of which the steam and other vapors generated are retained under the cover. Also the meat is baked as well as fried, and it may be brought to the desired condition without the drying out or crusting of the meat which occurs when it is fried according to the prior art, all while being under observation through the transparent cover.

Another object is the provision of another modification comprising a cover in the form of an inverted receptacle in which the cover is more shallow, but of sufficient size to cover larger pieces or larger areas of meat or, for example, to cover frying eggs for the purpose of effecting a basting of the eggs without the application of grease to the top of the eggs.

Other objects and advantages of the invention will be apparent from the following description and the accompanying drawings, in which similar characters of reference indicate similar parts throughout the several views.

Referring to the two sheets of drawings,

Fig. 1 is a view in perspective of a meat frying cover embodying the invention;

Fig. 2 is a top plan view showing the mode of attaching or detaching the handle from the cover;

Fig. 3 is a transverse sectional view taken on the plane of the line 3—3 of Fig. 1;

Fig. 4 is a view in perspective of one of the handle supporting frame members;

Fig. 5 is a view in perspective of a modification comprising an inverted receptacle of heat-resistive glass adapted to be used, for example, in expediting the frying or cooking of hamburgers;

Fig. 6 is a plan view of Fig. 5; and

Fig. 7 is another view in perspective of another modification in the form of an inverted receptacle of less depth, but of greater area, particularly adapted to be used in the frying of eggs for expediting this process, giving the finished egg, while still soft in its interior, a thin baked upper coating similar to that secured by basting, but without the necessity for applying hot grease to the top of the eggs.

Referring to Figure 1, 10 indicates in its entirety the meat frying cover embodying the invention. This cover comprises a relatively thick transparent plate 11 of heat-resistive glass such as that which is sold under the trade-mark "Pyrex," a knob or handle 12 and a knob supporting framework 13.

The transparent plate 11 is preferably circular, but may be rectangular, and is preferably made of flame-resisting glass as is distinguished from ordinary heat-resisting glass. The glass plate 11 is preferably provided with a relatively thicker border portion 14 of annular shape separated by a shoulder 15 from a depressed circular body portion 16 of lesser thickness.

The wide annular rib 14 is preferably turned uppermost so that the entire bottom surface 17 is plane and adapted to engage the bacon or other meat being fried evenly at all points.

While it is possible to provide a hole in such a flame-resisting plate of glass, this would involve special molds or tedious and expensive drilling operations with a small grinding member. I prefer to leave the circular plate intact without holes or other changes. Such drilling operations also cause strains in the glass, and it is also difficult to cast such plates of glass with holes without producing strains in the glass. Therefore, the simple circular plate with reinforced and thickened edge is adapted to give longer service, and to resist breakage more effectively than any of the structures of the prior art.

The handle 12 of the cover may be made of any suitable material, preferably heat insulating, but not necessarily as it is found that little heat is transmitted to this handle under operating conditions. Thus the knob 12 may be made of wood or metal or porcelain, but I prefer to make it of glass which, however, need not be heat resistive.

The knob may be of any desired shape but is preferably round and provided with a flat upper end 18 above an enlargement 19, which tapers down to a smaller size at 20 and again has a slight annular enlargement 21 so that the fingers may grasp the knob in the groove 20 without possibility of getting down past the ridge 21 into engagement with the plate 11 or framework 13, either or both of which may be quite hot.

The knob 12, chosen to illustrate the invention, happens to be polygonal in plan but may be perfectly round or any other suitable shape. Knob 12 has an axial through bore 22 extending from the top 18 to its flat bottom 23, and the through bore 22 preferably has a clearance around the knob supporting column 24 which is made of suitable metal, such as brass, iron, stainless steel or aluminum.

The knob 12 also has a countersunk formation 25 around the bore 22 at its upper end for receiving a fiber washer 26, which is forced into complementary shape by engagement with the lower frusto-conical side 27 of the head 28 of the column 24. The top of the head 28 is preferably rounded and convex leading to a fairly sharp edge 29 that is flush with the top of the knob 12. Thus the head 28 is substantially flush with the top of the knob and the knob is automatically centered between frusto-conical surface 27, washer 26 and frusto-conical recess 25 on the head so that the knob 12 is out of contact with the metal column 24 on all sides. It is thus effectively heat insulated from the column.

At its lower end the column 24 is formed with a reduced cylindrical portion 30 and with an annular shoulder 31, and the reduced cylindrical portion is adapted to be received in the apertures 32 of the separate frame members 33 which constitute the framework 13.

A fibre washer, such as one made of indurated fibre and indicated at 34, is first placed on the reduced portion 30, but the shoulder 31 is so located below the knob that there is a slight clearance 35 between the fibre washer 34 and the lower end 23 of the knob. Thus any riveting which is done on the column 24 is not such as tends to place any pressure on the glass knob 12, but the three frame members 33 are all placed upon the reduced portion 30 and confined between the shoulder 31 and the riveted or spun end 36.

The frame members 33 are preferably made of thin strips of sheet metal such as stainless steel, chromium plated steel or aluminum. The strips are made as thin as possible from top to bottom so that the end portions 37 which lie under the glass 11 are thinner than any bacon which will be fried under the cover.

The strips are preferably made relatively narrow so that they do not obscure the meat which is under the cover 10 and so that practically all of the meat is visible. Each of the frame members 33 is provided with an aperture 32 at its inner end of a size adapted to be received at the reduced portion 30 of the column 24.

Each of the frame members 33 has a hook 38 formed at its outer end by having this bent downwardly at right angles at 39, providing an end portion 40 which engages the periphery of the glass 11. The depth from top to bottom of the glass of the right angle portion 40 is slightly greater than the thickness of the annular rim 14 of the glass. The end of each frame member 33 is again bent inwardly at substantially right angles at 41 to provide the lower part 37 of the hook 38, which also acts as a foot serving to keep the glass out of contact with the griddle when there is nothing under it.

The foot portion 37 should, however, be thinner than the bacon so that the full weight of the cover rests upon all of the bacon under the cover and so that the cover is not supported by the feet when there is bacon under it.

The three frame members 33 are frictionally held on the reduced portion 30 by being clamped between the annular shoulder 31, fibre washer 34 and the riveted end 36, but the frame members or arms 33 may be pivoted with respect to each other on the reduced portion 30. This is of importance in making the handle 12 and its framework 13 conveniently removable from the glass plate 11, so that the plate can be cleaned and so that the frame can also be maintained in a clean and sanitary condition.

Thus the frame members or arms 33 can be folded until they are side-by-side or until they reach such a position, shown in Figure 2, that they are all on one side of a diameter of the glass plate 11, as shown in Figure 2. Then all of the hooks 38 will face in such a direction that the glass plate 11 can be inserted in the hooks from the dotted line position of Figure 2 to the full line position.

Thereafter the two lowermost arms 33 may be pulled downward, in Figure 2, at their outer ends until all of the hooks are equidistant from each other.

The length of the frame members or arms 33 is preferably such that the peripheral portion 40 of each hook 38 engages the cylindrical periphery 42 of the glass plate when the framework is in the position of Figure 1. Thus as the arms of the framework are moved into equiangular position the hooks are also pulled tight into frictional engagement with the edge of the glass plate, and each is adapted to be held there by the pull of the other two arms.

The additional thickness of the glass plate at 14 spaces the arms 33 from the upper central surface 16 of the glass plate because that surface is depressed, and the depression of the surface 16 may also keep the riveted end 36 out of engagement with the middle of the glass plate.

The glass plate being made of flame-resistive glass and being relatively thick, it is sufficiently heavy so that it will flatten out any bacon or meat upon which it is placed and hold the bacon or meat with flat engagement with the griddle. This shortens the time for cooking bacon or other meat because the radiant energy which comes from the griddle is again reflected by the glass plate into the bacon or meat.

Instead of the bacon curling up and coming into contact with the griddle only at the rounded parts of the bacon, the bacon is actually brought into engagement with the griddle over its full surface. It is found that very fat bacon may be fried to a flat and crisp condition which makes it also as palatable as better grades of bacon which include more meat.

The bacon may, of course, be fried to any desired condition, such as a crisp condition, or any intermediate condition between the raw and crisp, but in either event it is uniformly fried and not burned at the points of contact as in the methods of the prior art.

The operation of the meat frying cover is as follows: Assuming its parts are in the position of Figure 1, it may be lifted by the knob 12 and placed on top of any meat, such as bacon, which has been laid flatly on a griddle or frying pan. The bacon can be observed at all times and it is held in flat engagement with the griddle so that the bacon is fried uniformly over its full area and fried more quickly than it would be without the cover.

In the absence of any bacon at one side of the cover, the cover is, nevertheless, kept out of direct engagement with the griddle by the thin feet 27. I find that it is unnecessary to provide any grooves in the lower surface of the plate for discharging grease from the bacon under the plate. The spaces between the bacon provide conduits for the grease, and the griddle may be lifted once or twice while holding down on the knob 12 to pour the grease off during the frying of a griddle full of bacon.

Others may prefer to keep the grease on the griddle, the grease and cover serving to convey heat to all parts of the bacon so that it is fried in grease although there is only one layer of bacon beneath the cover. This conforms in using the grease to methods used by some chefs who prefer to fry the bacon in a frying pan in which the bacon is entirely immersed in grease.

The bacon may be turned over, if desired, to bring the other side to exactly the same condition as that which first engaged the griddle, but in any event the bacon may be fried much more quickly and its condition may be observed at all times to bring it to the desired turn.

It will thus be observed that I have invented an improved meat frying cover which may be constructed of an integral flat circular plate of flame-resistive glass, without any drilled or cast holes so that the plate can withstand heat better than any of the devices of the prior art.

This plate is supported by means of a heat-insulated handle having a framework that is detachable from the plate for cleaning. The framework is simple, and may have a glass knob because it is so constructed that it places no strain upon the glass knob. The framework itself is also spaced from the body of the plate, but engaged with the plate only at a thickened reinforcing edge portion of the plate, and the framework also provides relatively thin feet which keep the glass plate from direct engagement with the griddle, but do not interfere with the plate engaging relatively thin bacon carried by the griddle.

Referring to Figure 5, this is a view in perspective of a modification in which the cover 45 is in the form of an inverted receptacle of transparent heat-resistive glass which may also be flame-resistive glass, if desired. The cover 45 is in the nature of an enlarged saucedish which is relatively deep and amply large to surround one portion of meat, such as a hamburger. It has a frusto-conical outer wall 46, a rounded bottom corner 47 and a flat bottom 48, and is, of course, open at the top 49 which becomes the open bottom when used as shown in Figure 5.

In this case the knob supporting framework 50 preferably consists of three strips of metal, such as stainless steel, which are again provided with an aperture 51 at their upper ends for receiving the rivet 52 which passes through a wooden knob 53. With the wooden knob the three metal strips 54, which comprise the framework 50, may all be quite tightly riveted to the wooden knob 53 but they are adapted to be turned or rotated on the rivet 52.

In this case the strips 54 conform to the shape of the bottom of the receptacle 45 in that they have an outwardly extending flat portion 55, an easy downward bend at an obtuse angle at 56, a straight diagonally and outwardly extending portion 57, and an upwardly extending hook 58.

The strips 54 are preferably as thin as is consistent with the desired strength so that the lower edge 59 is spaced from the pan or griddle only slightly by the hooks 58. The grease, gravy or other juices resulting from the frying are sufficient to establish a substantially air-tight seal around the edge of the receptacle 45, in spite of the presence of the hook feet 58.

When such a transparent cover is used with a hamburger, for instance, the hamburger is baked from the top in vapors resulting from the frying as well as being fried from the bottom; the hamburger is not dried out like it is when fried according to the prior art; it tends to retain its original size and does not shrink so greatly, and it is, of course, baked in vapors which contain the original aromas from the meat whereby it is made more palatable, all while being observed through the transparent glass cover.

Referring to Figure 6, this is a similar view of another modification which differs from Figure 5 only in shape and size. In this case the inverted receptacle 60 is a good-sized pie plate of heat-resisting transparent glass and may be also flame-resisting. The framework 61 is similar in construction, but its parts are proportioned to the dimensions of the receptacle 60 and the knob 62 is secured in exactly the same way as described with respect to Figure 5.

This particular cover has greater utility in the frying of eggs, in that the egg may be baked from the top at the same time it is being fried and while still maintaining the interior of the egg soft, the egg may be coated with a thin film of the white of the egg baked to a white condition and producing an effect similar to the basting of the egg, but without getting the egg greasy by the application of grease to the top of the egg.

Both of these modified forms of covers may have their frameworks and knob detached by pivoting all of the arms around to the same side of the cover. Then the hooks will all face in the same direction so that they can be hooked on the edge of the cover and the arms can then be rotated relatively to each other on the knob until they are equidistant from each other at the periphery. As this is done it places a tension on each arm whereby the arms become tight on the cover, which may be lifted by the knob. The knob and framework are, of course, easily removed to clean the cover so that it may be maintained in a clean and sanitary condition at all times.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A meat frying cover, comprising a cover member of heat resistive glass, having a circular outer edge and a substantially plane upper surface, and a removable heat insulated handle, comprising a central pivot member extending substantially at right angles to said plane surface, an insulating knob mounted on the upper end of said pivot member, and a plurality of thin sheet metal straps lying on said plane surface, said straps each having a downwardly and backwardly extending hook at its outer end, for engaging over said circular edge, and each strap having a bearing aperture at its other end, said straps being pivoted on said pivot member, to permit pivotal movement of said hooks to the same side of said cover, for removal of the hooks for cleaning purposes or for pivotal movement to locate said hooks at opposing positions on said cover, the said straps being of such a length relative to the cover member that the strap hooks bind on the circular edge of the cover when the straps are radial to exert a pull upon the pivot and upon each other, for frictionally retaining the hooks on said circular edge.

2. A meat frying cover according to claim 1, in which the cover comprises a flat plate also having a lower plane surface for engaging bacon or the like to hold it in a flat condition while frying.

3. A meat frying cover according to claim 1, in which the cover comprises an inverted dish having a downwardly and outwardly slanting frustoconical side wall, joined to an upper flat base by an easy curve, said flat base having said upper plane surface, and said straps being shaped complementarily to the outside of said dish.

4. A meat frying cover according to claim 1, in which the cover comprises an inverted glass pie pan having a flat bottom, a conical side wall, and a radial edge, said flat bottom having said plane surface, and said straps being shaped complementarily to the outside of said pan.

ROBERT H. WENDT.

REFERENCES CITED

The following references are of record in the file of this patent:

UNITED STATES PATENTS

| Number | Name | Date |
| --- | --- | --- |
| 968,557 | Hansen | Aug. 30, 1910 |
| 1,026,354 | Henry | May 14, 1912 |
| 1,624,214 | Cannon | Apr. 12, 1927 |
| 1,763,965 | High | June 17, 1930 |
| 1,783,792 | Isaacson | Dec. 2, 1930 |
| 1,792,463 | Keeney | Feb. 10, 1931 |
| 2,135,225 | Sladky | Nov. 1, 1938 |
| 2,241,040 | Pringle | May 6, 1941 |

FOREIGN PATENTS

| Number | Country | Date |
| --- | --- | --- |
| 141,075 | Germany | May 8, 1903 |